March 13, 1934.  J. H. JOHNSON  1,950,923
LOAD BINDER
Filed Sept. 1, 1932  2 Sheets-Sheet 1
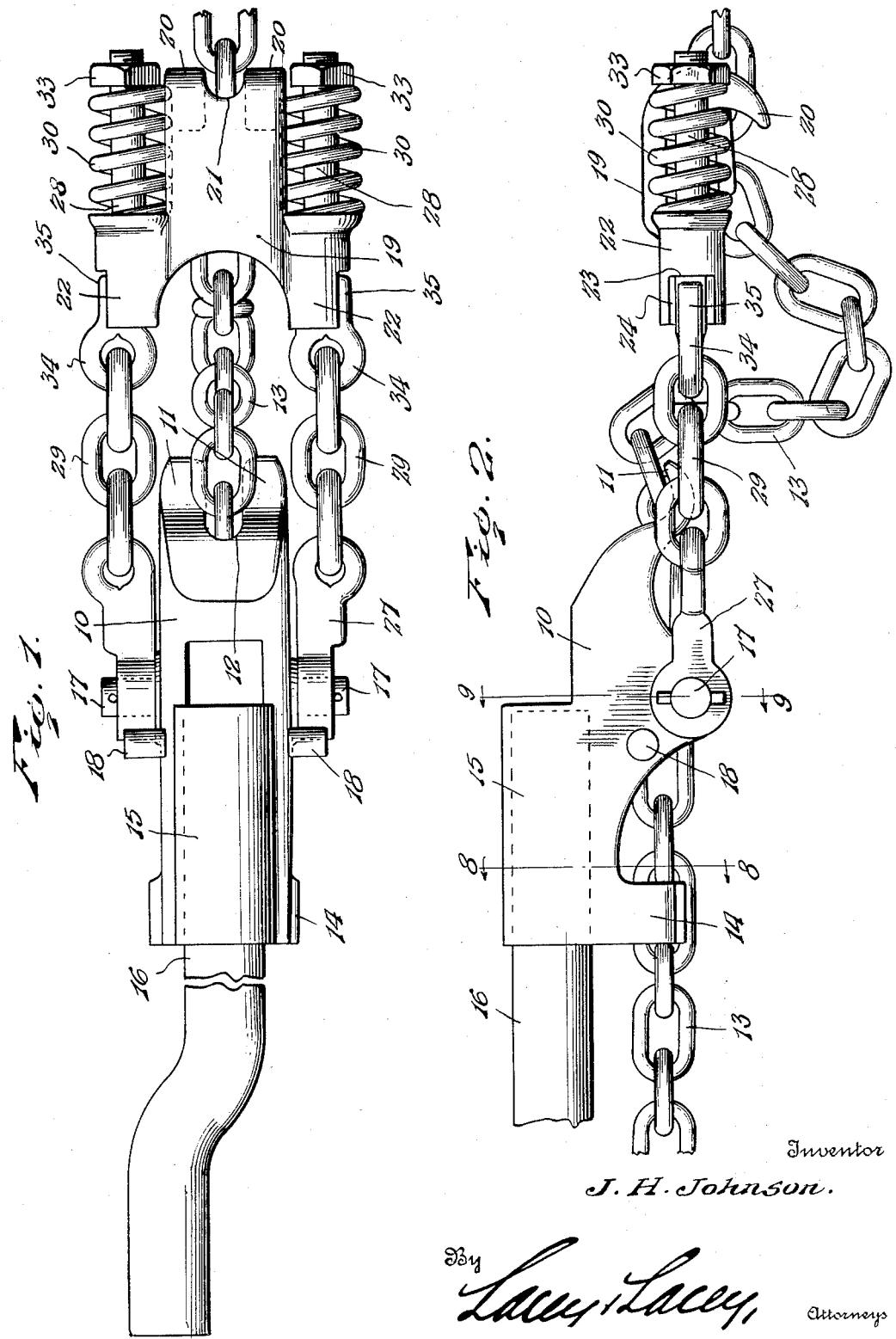

March 13, 1934.  J. H. JOHNSON  1,950,923
LOAD BINDER
Filed Sept. 1, 1932  2 Sheets-Sheet 2
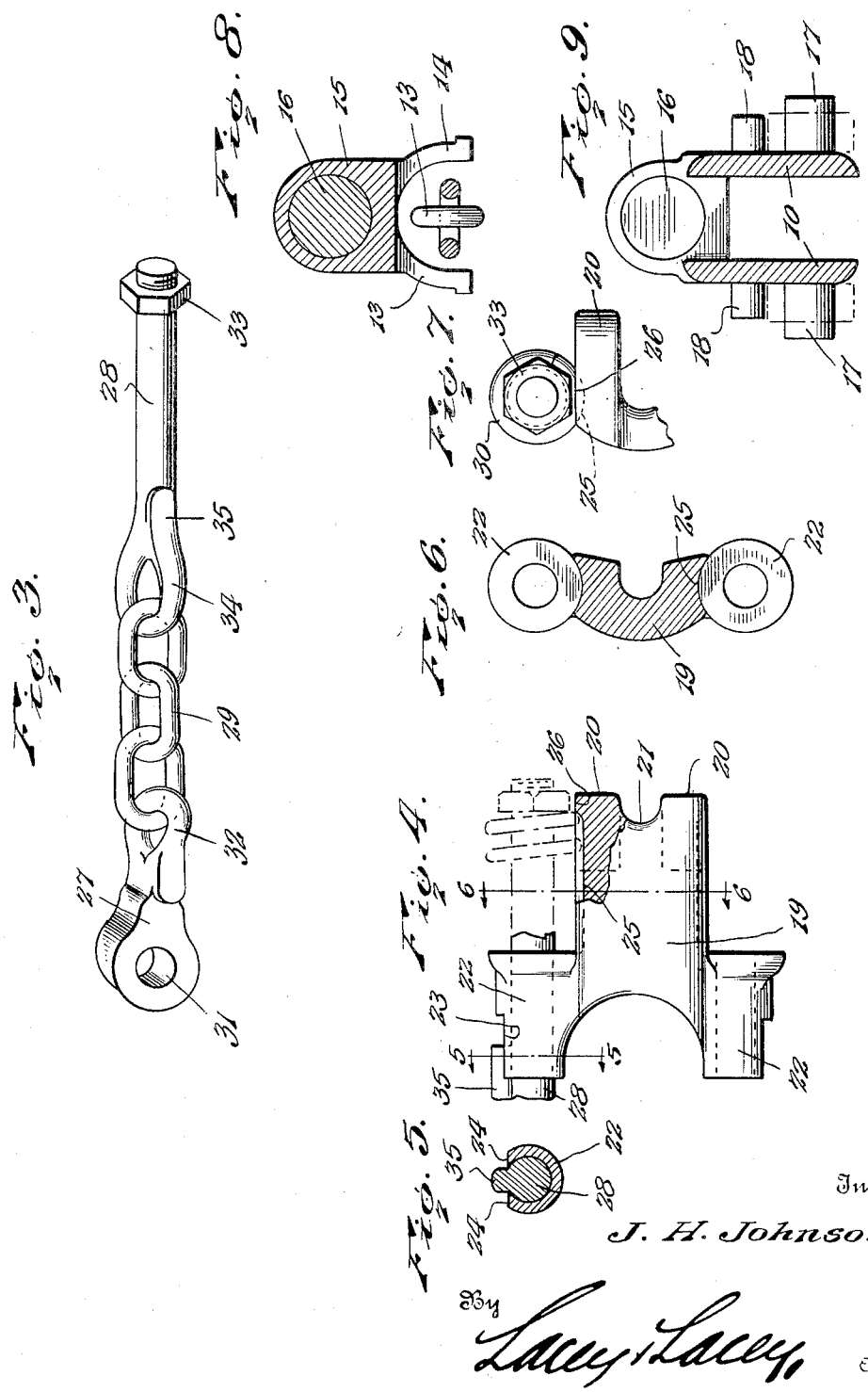
Inventor
J. H. Johnson.
By Lacey & Lacey, Attorneys Patented Mar. 13, 1934

1,950,923

UNITED STATES PATENT OFFICE 1,950,923

LOAD BINDER

Joseph H. Johnson, Bradford, Pa.

Application September 1, 1932, Serial No. 631,433

4 Claims. (Cl. 254—78)

This invention relates to load binders of that general type described in my former Patents 448,862, dated March 24, 1891, and 467,348, dated January 19, 1892.

An object of the invention is to improve the construction and utility of load binders of this type by providing a clevis on which the sliding coupling is mounted with springs or an elastic cushion to impart a yielding or elastic character to the girt which binds the load.

A further object is to provide chains or similar flexible connectors in lieu of the usual rigid side bars, means being provided for holding the flexible chains against twisting or becoming tangled so that the proper functioning of the device will be assured under severe conditions of service.

A further object is to provide a novel body or frame which is equipped to readily and interchangeably receive various lengths of levers.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of the load binder,

Figure 2 is a side elevation of the load binder,

Figure 3 is a perspective view of one of the flexible connections between the body and the clevis, Figure 4 is a plan view of the clevis with a part broken away to show the spring seat, Figure 5 is a detail section taken on the line 5—5 of Figure 4 showing the shoulders on the clevis to prevent twisting of the eye bolts of the flexible connector, Figure 6 is a cross section taken on the line 6—6 of Figure 4 showing the bearings of the clevis, Figure 7 is a fragmentary end elevation of the clevis showing the shoulders for preventing rotation of the nut on the eye bolt, Figure 8 is a cross section taken on the line 8—8 of Figure 2, and Figure 9 is a cross section taken on the line 9—9 of Figure 2.

Referring now to the drawings in which like characters of reference designate similar parts in the various views, 10 designates a body which is provided with a pair of jaws 11 having a central opening 12 therebetween to grip the load binding chain 13. The body is provided, at the end opposite the jaws, with an inverted U-shaped guide 14 which serves the purpose of holding the body over the direct line of draft of the load girt or chain 13. The body is provided with an integral ferrule 15 adapted to removably and interchangeably receive various lengths of handles, one of which is indicated at 16. Integral with the body are a pair of gudgeons 17 and beyond the gudgeons the body is provided with a pair of stop lugs 18.

Connected to the body by flexible connectors, hereinafter described, is a clevis 19 which is equipped with a pair of jaws 20 having a central opening 21 therebetween to grip the load binding chain 13. The clevis, as best shown in Figures 4 and 6, is provided with a pair of tubular bearings 22. The bearings are provided, in the outer sides, with slots 23 which produce stop shoulders 24. Furthermore, the side faces of the clevis 19 are hollowed out to provide curved seats 25, best shown in Figures 4, 6 and 7. In addition, beyond the curved seats said side faces terminate in straight flat stop shoulders 26, best shown in Figures 4 and 7.

For flexibly connecting the body 10 with the clevis 19 I provide flexible connectors, best shown in Figure 3, and each including a toggle 27, an eye bolt 28, a chain 29, and a helical spring 30, the latter being shown in Figures 1 and 2. The toggle is provided with a bearing opening 31 to receive the corresponding side gudgeon 17 of the body 10 and is also provided with an eye 32 having a hook-like enlargement thereon to receive one end of the chain. The eye bolt is provided with a nut 33 to retain the spring 30 thereon and is also provided with an eye 34 having a hook-like enlargement at one side thereof to receive the opposite end of the chain.

By now referring to Figure 4, it will be seen that the arcuate bearing seat 25 in the side face of the clevis seats the spring 30, while the stop shoulder 26, at the end of the seat, prevents rotation of the nut 33, as shown in Figure 7. Furthermore, the bill 35 of the eye 34, as best shown in Figures 2 and 5, engages in the slot 23 of the clevis bearing 22 and is prevented from rotation by the stop shoulders 24. The flexible side connectors, it will be seen from the foregoing, are held in position and prevented from becoming twisted or tangled for the following reasons. The stop lugs 18 limit swiveling movement of the toggles 27, the concave seats 25 in the sides of the clevis, by fitting the spring 30, help to keep the eye bolts 28 in alignment, the bolt is prevented from turning on its axis by the stop shoulders 24 at the opposite sides of the bill 35 of the bolt and finally, the nut 33 is prevented from turning by the stop shoulders 26.

The handle 16 is made separate from the body and is removably received in the ferrule 15 so that it may be replaced with a longer or shorter handle and can be removed from the device when the same is not in use as it is objectionable after the load has been bound. The handle may be made of tubing or wood in any suitable shape and of any suitable material.

In operation, the load girt or binder chain 13 is passed between the hooks 20 of the clevis and then the hooks 11 of the body 10 are engaged upon the chain when the handle is rocked at substantially a right angle to the position shown in Figure 2. The handle may now be closed down against the chain to the position shown in Figure 2 so that a bight will be formed in the chain sufficient to take up slack and hold the binder chain taut upon the load. The springs 30 act as an elastic cushion to impart a yielding or elastic characteristic to the taut girt so that the binder chain 13 will not break by any sudden jar incident to driving over rough or uneven roads.

From the above description it is thought that the construction and operation of my invention will be fully understood without further explanation.

What is claimed is:

1. A device for taking up the slack in girts, comprising a body having jaws at one end to receive the girt chain, a handle lever for rocking the body, a clevis having jaws for receiving said chain, toggles carried by the body, eye bolts slidably mounted on the clevis, flexible conections between the toggles and the eye bolts, springs on the eye bolts resisting movement of the eye bolts, means carried by the clevis for preventing axial rotation of the eye bolts, and means carried by the body for limiting pivotal movement of the toggles.

2. A device for taking up the slack in girts, comprising a body having jaws at one end to receive the girt chain, a handle lever for rocking the body, a clevis having jaws for receiving said chain, gudgeons carried by the side of the body, toggles pivoted on said gudgeons, stop lugs carried by the body for limiting pivotal movement of the toggles, spring controlled eye bolts slidably mounted on the clevis, chains connecting the eye bolts with the toggles, and means carried by the clevis for preventing axial rotation of the eye bolts.

3. A device for taking up the slack in girts, comprising a body having jaws at one end to receive the girt chain, a handle lever for rocking the body, a clevis having jaws for receiving said chain, toggles carried by the body, chains carried by the toggles, tubular bearings formed on the clevis, eye bolts slidably fitted in said bearings and connected to said chains, springs on the eye bolts fitted against the sides of the clevis, and nuts on the eye bolts for adjusting the tension of said spring.

4. A device for taking up the slack in girts, comprising a body having jaws at one end to receive the girt chain, a handle lever for rocking the body, a clevis having jaws for receiving said chain, eye bolts slidably mounted on the clevis, the sides of the clevis being hollowed out to provide arcuate seats for the springs, said seats terminating in straight flat stop shoulders at the outer end of the clevis, nuts on said eye bolts for adjusting the tension of the springs and held against axial rotation by said stop shoulders, toggles carried by said body, chains connecting the eye bolts with the toggles, and stop lugs carried by the body for limiting pivotal movement of the toggles.

JOSEPH H. JOHNSON.